United States Patent
Sasaki (10) Patent No.: US 12,292,284 B2
(45) Date of Patent: May 6, 2025

(54) MEASURING SYSTEM, MEASURING METHOD, AND MEASURING PROGRAM

(71) Applicant: Topcon Corporation, Tokyo (JP)

(72) Inventor: You Sasaki, Tokyo (JP)

(73) Assignee: Topcon Corporation, Tokyo (JP)

( * ) Notice: Subject to any disclaimer, the term of this patent is extended or adjusted under 35 U.S.C. 154(b) by 297 days.

(21) Appl. No.: 17/807,294

(22) Filed: Jun. 16, 2022

(65) Prior Publication Data

US 2022/0404147 A1    Dec. 22, 2022

(30) Foreign Application Priority Data

Jun. 18, 2021  (JP) .................................. 2021-101725

(51) Int. Cl.
*G01C 11/06* (2006.01)
*G06T 7/00* (2017.01)

(52) U.S. Cl.
CPC .............. *G01C 11/06* (2013.01); *G06T 7/001* (2013.01); *G06T 2207/10028* (2013.01)

(58) Field of Classification Search
CPC ..................... G01C 11/06; G06T 7/001; G06T 2207/10028
USPC ....................................................... 382/103
See application file for complete search history.

(56) References Cited

U.S. PATENT DOCUMENTS

| | | |
|---|---|---|
| 10,767,990 B2 | 9/2020 | Sasaki |
| 2010/0245587 A1 | 9/2010 | Otani et al. |
| 2011/0064312 A1* | 3/2011 | Janky ........................ G06T 7/74 382/195 |
| 2016/0148421 A1 | 5/2016 | Friend |

(Continued)

FOREIGN PATENT DOCUMENTS

| | | |
|---|---|---|
| JP | S6218884 A | 1/1987 |
| JP | H06236209 A | 8/1994 |

(Continued)

OTHER PUBLICATIONS

Extended European Search Report mailed Dec. 5, 2022 in connection with European Patent Application No. 22178580.1, 9 pgs.

(Continued)

*Primary Examiner* — Quang N Vo
(74) *Attorney, Agent, or Firm* — Chiesa Shahinian & Giantomasi PC (57) ABSTRACT

In order to monitor operation situations of site resources at a construction site efficiently, a measuring system uses a surveying apparatus 100 including a camera and a position-determining function using laser light, and the measuring system includes a photographing means for continuously photographing construction machines 201 to 204 which are site resources for performing operations at a construction site by the camera, a recognizing means recognizing the site resources in photographed images obtained by the photographing, a tracking means for tracking the image of the site resources recognized in the multiple photographed images obtained by the continuous photographing, and a position-determining means collimating to the site resources which are objects for the tracking, and determining the positions of site resources by the position-determining function, in which the determining of positions is performed multiple times at intervals.

7 Claims, 9 Drawing Sheets

(56) References Cited

U.S. PATENT DOCUMENTS

| | | |
|---|---|---|
| 2017/0256005 A1 | 9/2017 | Olsson |
| 2018/0274920 A1 | 9/2018 | Sasaki |
| 2018/0357583 A1 | 12/2018 | Guillemette |
| 2019/0392601 A1* | 12/2019 | Shamilov ............... H04N 23/56 |
| 2020/0005688 A1 | 1/2020 | Chapman et al. |
| 2021/0034058 A1 | 2/2021 | Subramanian et al. |
| 2022/0178114 A1 | 6/2022 | Takahama |

FOREIGN PATENT DOCUMENTS

| | | |
|---|---|---|
| JP | H06241795 A | 9/1994 |
| JP | H06258077 A | 9/1994 |
| JP | 200290143 A | 3/2002 |
| JP | 2002536646 A | 10/2002 |
| JP | 2003329448 A | 11/2003 |
| JP | 2010237169 A | 10/2010 |
| JP | 2018146407 A | 9/2018 |
| JP | 2018-159565 A | 10/2018 |
| WO | 2020241618 A1 | 12/2020 |

OTHER PUBLICATIONS

"OKI develops motion mapping technology that combines camera images an laser distance sensors to visualize the movements of people, vehicles and equipment", Times Corporation, retrieved online at "https://prtimes.jp/main/html/rd/p/000000150.000017036.html", 2017, 2 pgs. (including translation).

Notice of Reasons for Refusal mailed Feb. 13, 2025 in connection with Japanese Patent Application No. 2021-101725, 9 pgs. (including translation).

* cited by examiner

MEASURING SYSTEM, MEASURING METHOD, AND MEASURING PROGRAM

CROSS-REFERENCE TO RELATED APPLICATIONS

This application claims priority from Japanese Patent Application No. 2021-101725, filed Jun. 18, 2021, the disclosure of which is incorporated herein by reference in its entirety.

FIELD

The present invention relates to a technique for understanding operation conditions of site resources, such as construction machine, at construction sites.

BACKGROUND

There is demand for improvement of operation efficiency of site resources, such as construction machine, at construction sites. To achieve this, it is necessary to monitor operation situations at construction sites. For example, in Patent document 1, a technique is disclosed in which construction machine is identified using images photographed by a flying UAV so as to track movements of construction machines.

Patent document 1: Japanese Unexamined Patent Application Publication No. 2018-159565.

SUMMARY

In monitoring operation situations of site resources, such as a construction machine, at a construction site, it is desirable that manpower be minimized as much as possible, and that it be automated. Under such circumstances, an object of the present invention is to provide a technique in which monitoring of operation situations of site resources at a construction site can be performed efficiently.

An aspect of the present invention is a measuring system including: a camera for continuously photographing site resources which perform operations at a construction site; a recognizing means for recognizing the site resources in photographed images obtained by the photographing; a tracking means for tracking the image of the site resources recognized in the multiple photographed images obtained by the continuous photographing; and a position-determining means for collimating to the site resources which are objects to be tracked, and determining the positions of the site resources by laser light; in which the determining of position is performed multiple times at intervals.

In the present invention, an embodiment is desirable in which the system further includes a map-preparing means for a map displaying movement transitions of the site resources. In the present invention, an embodiment is desirable in which recognition of the site resources is performed by comparison between an image photographed by the camera, and an image in which a preliminarily prepared three-dimensional model of the site resources which is an object to be recognized is viewed from multiple different viewpoints.

In the present invention, an embodiment can be mentioned in which the site resource is a construction machine. Here, an embodiment can be mentioned in which the construction machine includes a base unit for running and a movable unit moving on the base unit, and the system further includes a moving center calculating means for calculating a point fixed on the base unit, not the measured point, as a moving center based on result of the determining of position.

In the present invention, an embodiment may be mentioned in which a relationship between external orientation elements of the camera and external orientation elements of the position-determining means is known, based on the relationship, a position of a reflection point of the laser light in the image of the construction machine photographed by the camera is calculated as a first relationship, by the comparison, a three-dimensional model corresponding to the image of the construction machine photographed by the camera is calculated as a second relationship, based on the first relationship and the second relationship, position of reflection point of the laser light in the three-dimensional model of the construction machine is calculated, and based on a position of a reflection point of the laser light in the three-dimensional model of the construction machine, the moving center is calculated.

In the present invention, an embodiment may be mentioned in which the site resources are multiple, the tracking is performed with respect to each of the multiple site resources, the continuous photographing is continued during the collimating, and the tracking is performed with respect to the site resources which are not objects of the collimating during the collimating.

The present invention may be understood as a measuring method, including: a step of continuously photographing site resources which perform operations at a construction site by a camera; a step of recognizing the site resources in photographed image obtained by the photographing; a step of tracking the image of the site resources recognized in the multiple photographed images obtained by the continuous photographing; and a step of determining position collimating to the site resources which are object for the tracking, and determining the position of site resources by laser light; in which the determining of the position is performed multiple times at intervals.

The present invention may be understood as a measuring program which is executed by a computer, the program including: a step of continuously photographing site resources which perform operations at a construction site by a camera; a step of recognizing the site resources in photographed image obtained by the photographing; a step of tracking the image of the site resources recognized in the multiple photographed images obtained by the continuous photographing; and a step of determining position collimating to the site resources which are object for the tracking, and determining the position of site resources by laser light; in which the determining of the position is performed multiple times at intervals.

Effects of Invention

According to the present invention, the monitoring of operation situations of site resources at a construction site can be performed efficiently

EMBODIMENTS OF INVENTION

1. First Embodiment

Summary

Figure 1:
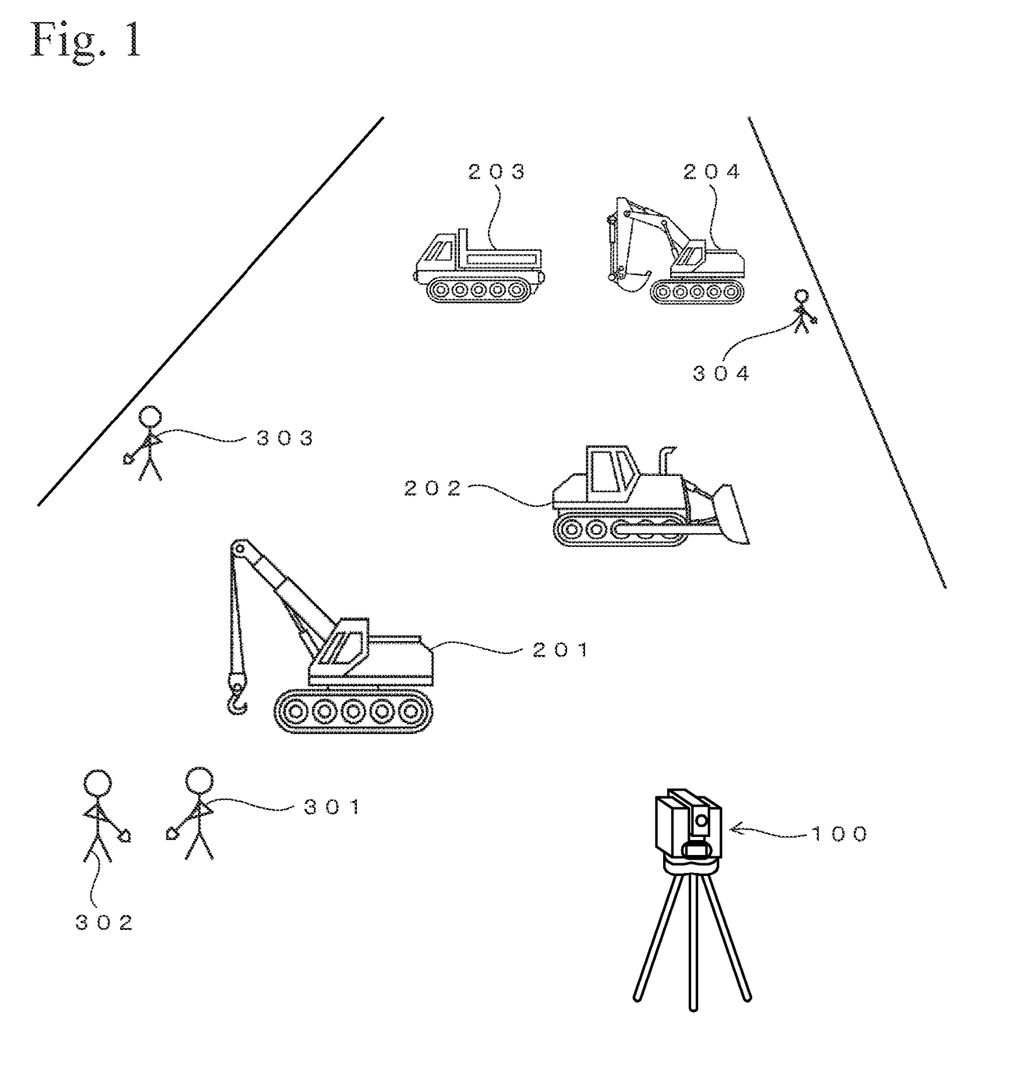
FIG. 1 is a conceptual diagram showing a measuring system using the present invention.

FIG. 1 shows an example of a measuring system using the present invention. FIG. 1 shows a surveying apparatus 100. The surveying apparatus 100 is a total station having functions of a camera, laser measuring, and automatic tracking for an object for surveying. The surveying apparatus 100 identifies an object for tracking among images photographed by the camera equipped by itself, tracks this identified object in the photographed image, and determines position of the object by laser light. Details in the surveying apparatus 100 will be explained later.

FIG. 1 shows construction machines 201 to 204, and workers 301 to 304 for civil engineering work. In this example, the construction machines 201 to 204 and the workers 301 to 304 are the site resources. Operation situations of these site resources are measured by the surveying apparatus 100. A target site resource is a machine or human relating to construction at the construction site, and other moving objects. As a machine which is handled as a site resource, kinds of construction machine, electric power, concrete mixer, compressor, and the like, which are movable, may be mentioned.

The surveying apparatus 100 photographs the operation site by its camera. Among the photographed images, the site resources (construction machines 201 to 204 and workers 301 to 304), which are objects for tracking, are recognized, and each of the recognized site resources is identified.

Each of the identified site resources is tracked and the position of each is determined by the surveying apparatus 100. Position information in which the position of each site resource determined by the surveying apparatus 100 is plotted on a map (for example, FIG. 9). By monitoring changes in position of each construction machine with the passage of time, transitions of operation situations of site resources can be known.

The above process is automatically performed. Therefore, the monitoring of operation situations of the site resources at the construction site can be effectively performed.

Surveying Apparatus

Figure 2A:
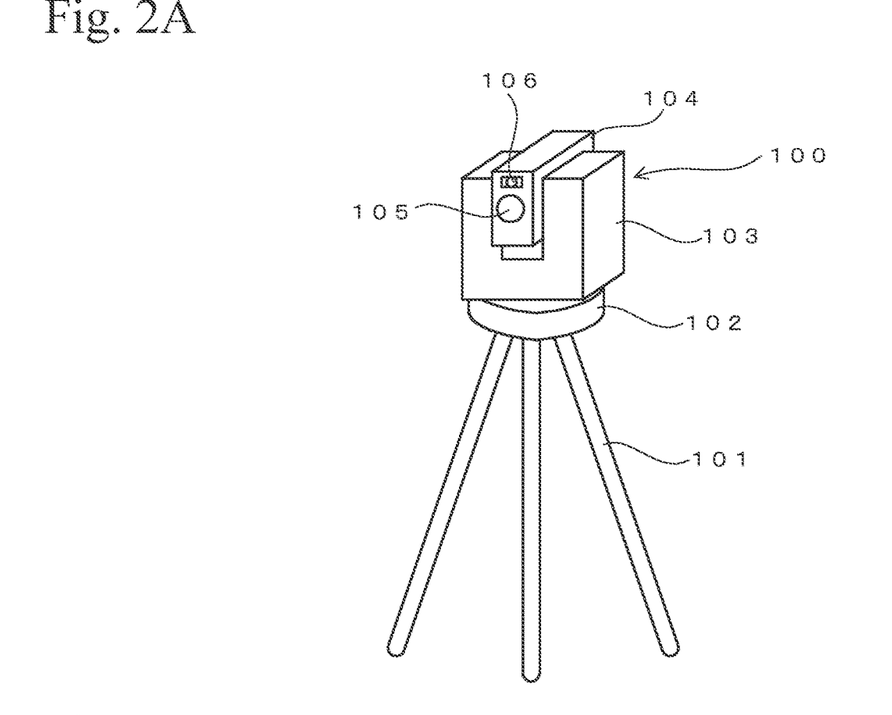
FIG. 2A is an oblique view of a surveying apparatus viewed from the front.
Figure 2B:
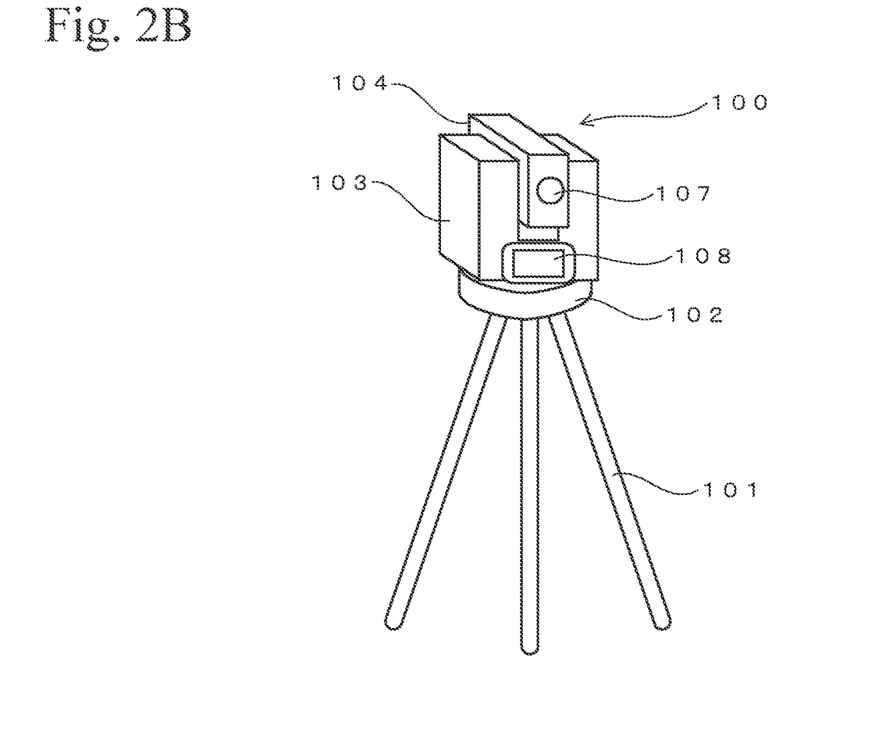
FIG. 2B is an oblique view viewed from the back.

FIGS. 2A and 2B are oblique views of the surveying apparatus 100. FIG. 2A is an oblique view seen from the front, and FIG. 2B is an oblique view seen from the back. The surveying apparatus 100 includes a base unit 102 fixed on a tripod 101, a horizontal rotating unit 103 horizontally rotatable on the base unit 102, and a vertical rotating unit 104 vertically rotatable (elevation angle control and depression angle control) held on the horizontal rotating unit 103.

The horizontal rotation and the vertical rotation are performed by a motor. A horizontal angle (an indicating direction of an optical axis of a telescope 105 within a horizontal direction) of the horizontal rotating unit 103 and a vertical angle (elevation angle or depression angle of the optical axis of the telescope 105) of the vertical rotating unit 104 are accurately measured by an encoder.

On a front surface of the vertical rotating unit 104, the telescope 105 and a wide angle camera 106 are arranged, and on a back surface thereof, an eyepiece unit 107 of the telescope 105 and a touch panel display 108 are arranged. The telescope 105 doubles as an optical system of a narrow angle (telescopic) camera 111 shown in FIG. 3. Furthermore, via an objective lens of the telescope 105, a ranging laser light for ranging is irradiated to the outside, and a reflected light thereof is received.

The touch panel display 108 combines an operation panel and a display of the surveying apparatus 100. The touch panel display 108 displays kinds of information regarding operation of the surveying apparatus 100 and information regarding surveying results.

Figure 3:
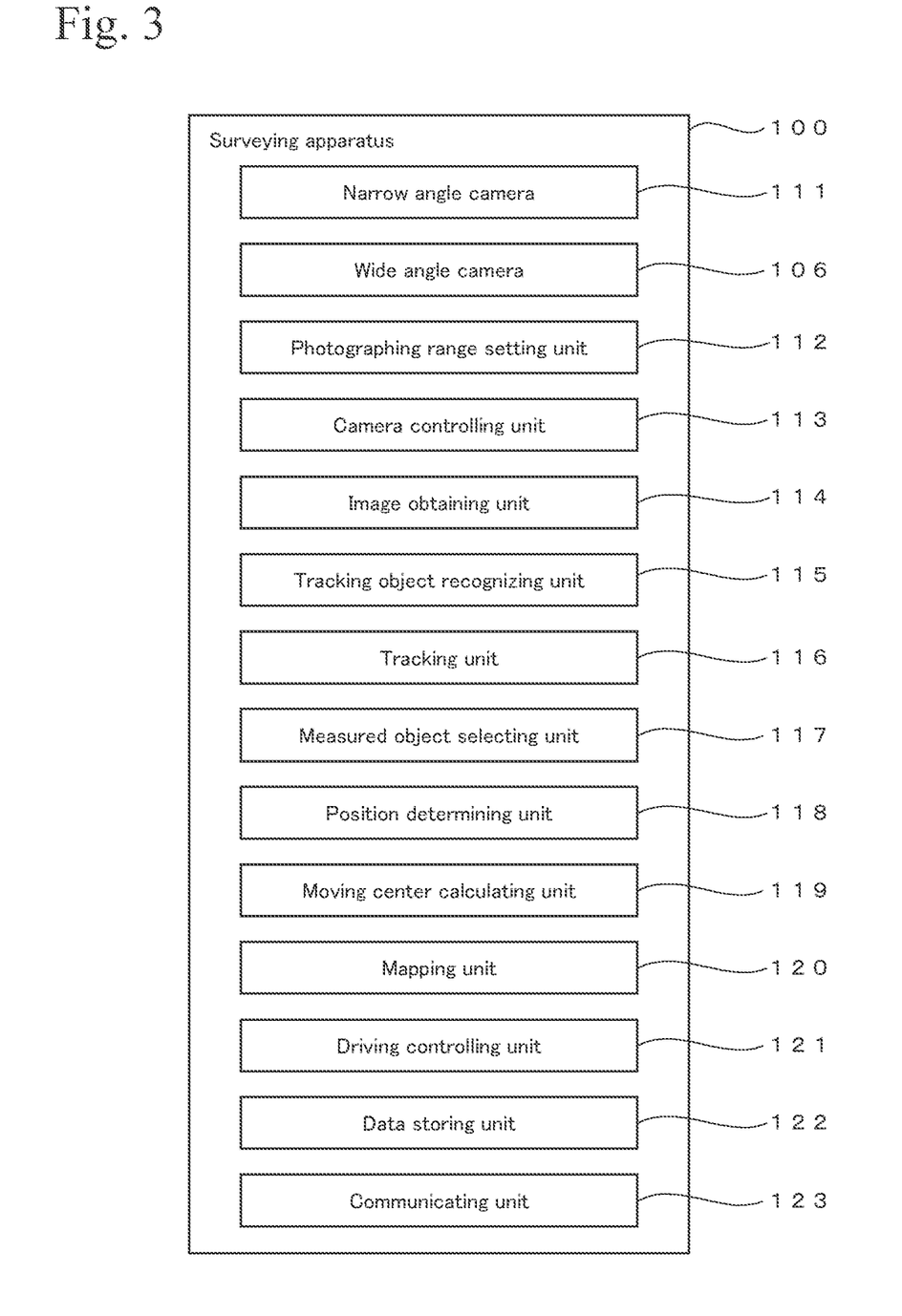
FIG. 3 is a block diagram of the surveying apparatus.

FIG. 3 is a block diagram of the surveying apparatus 100. The surveying apparatus 100 includes the narrow angle camera 111, the wide angle camera 106, a photographing range setting unit 112, a camera controlling unit 113, an image obtaining unit 114, a tracking object recognizing unit 115, a tracking unit 116, a measured object selecting unit 117, a position-determining unit 118, a moving center calculating unit 119, a mapping unit 120, a driving controlling unit 121, a data storing unit 122, and a communicating unit 123.

Each of functioning units, that is, the photographing range setting unit 112, the camera controlling unit 113, the image obtaining unit 114, the tracking object recognizing unit 115, the tracking unit 116, the measured object selecting unit 117, the moving center calculating unit 119, the mapping unit 120, and the data storing unit 122, are realized by a computer equipped with the surveying apparatus 100.

The computer includes a CPU, a storage device, and an interface. Action programs for executing functions of the functioning units are read and executed by the computer, so as to realize each of the above functioning units. An embodiment is also possible in which some or all of the functioning units are realized by dedicated hardware. Furthermore, an embodiment is also possible in which some or all of the functioning units are realized by an FGPA or the like.

The narrow angle camera 111 photographs in a relatively narrower range via the telescope 105. In this photographing, a magnified image can be photographed by the telescope, and a finer image than the wide angle camera 106 can be photographed. The wide angle camera 106 photographs in a relatively wider range (wide angle).

Relationship of external orientation elements (position and orientation) among optical systems of the narrow angle camera 111, the wide angle camera 106 and the below-mentioned position-determining unit 118 in the surveying apparatus 100 are known. In addition, optical axes of the optical systems of the narrow angle camera 111 and the position-determining unit 118 exist on the same axis line (on an optical axis of the telescope 105). An optical axis of the wide angle camera 106 is in parallel relationship with the optical axes of the optical systems of the narrow angle camera 111 and the position-determining unit 118 (the optical axis of the telescope 105).

The photographing range setting unit 112 relates to the process of step S101 explained below, and it sets a range of photographing by the wide angle camera 106. The camera controlling unit 113 controls photographing action of the wide angle camera 106 and the narrow angle camera 111. The image obtaining unit 114 obtains image data of an image photographed by the wide angle camera 106 and the narrow angle camera 111.

The tracking object recognizing unit 115 performs the process of step S104 explained below. The tracking unit 116 performs the process of step S105 explained below. The measured object selecting unit 117 performs the process of step S106 explained below.

The position-determining unit 118 performs the process of step S107 explained below. The position-determining unit 118 includes an emitting unit of ranging light (laser light for ranging), an irradiation optical system thereof, a receiving light optical system of the ranging light reflected from an object, a light receiving element, a calculating unit for ranging to the reflection point of the ranging light, and a calculating unit for position of the reflection point of the ranging light based on direction of the optical axis and the ranged value.

The distance to the reflection point is calculated by using a principle of light wave ranging. To calculate distance, a method using phase difference of received ranging light, and a method using propagation time, may be mentioned. In this example, ranging is performed by the method using phase difference.

In the method using phase difference, a control optical path is arranged in the surveying apparatus 100, and a distance to an object is calculated based on difference (phase difference) between a light receiving timing of ranging light which is propagated in this control optical path and a light receiving timing of the ranging light which is reflected from the object. In the method using propagation time, a distance to an object is calculated based on a time from ranging light reaching the object to reflected light returning.

Based on a distance to reflection point of ranging light and its direction, position of the reflection point is calculated regarding the surveying apparatus 100 as an origin. If external orientation elements of the surveying apparatus 100 in an absolute coordinate system are known, the position of the reflection point in the absolute coordinate system can be calculated. The absolute coordinate system is a coordinate system used in GNSS or map. For example, the position in the absolute coordinate system is described by a latitude, longitude, and altitude.

Figure 6:
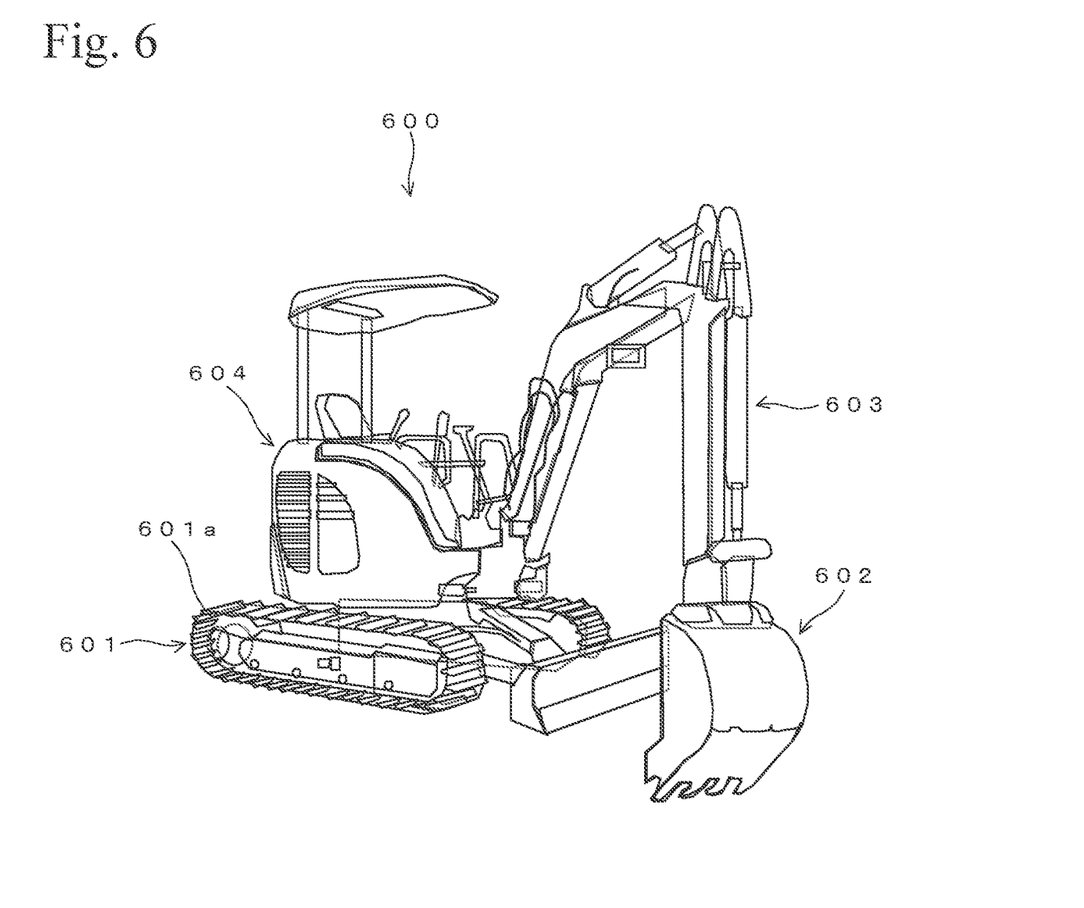
FIG. 6 is an oblique view of a construction machine.

The moving center calculating unit 119 performs the process of step S108 explained below. For example, a hydraulic shovel 600 shown in FIG. 6 is considered. The hydraulic shovel 600 includes a caterpillar track 601a and a moving base 601 for moving on the ground by the caterpillar track 601a. On the moving base 601, a driver seat is arranged and a rotating unit 604 supporting the root of an arm 603 is arranged. Furthermore, a bucket 602 is connected to the top of the arm 603.

In a case in which the hydraulic shovel 600 operates without moving, each of positions of the rotating unit 604, the arm 603, and the bucket 602 moves; however, position of the hydraulic shovel 600 as a vehicle does not move. In this case, if an object of which the position is to be determined is set at the arm 603 or the bucket 602, a condition of moving of the hydraulic shovel 600 cannot be appropriately understood. In this case, by setting the object of which the position is to be determined at the moving base 601 of the hydraulic shovel 600, movement of the hydraulic shovel 600 can be appropriately understood.

The mapping unit 120 describes position of a tracking object on a map and describes its transition. Position and time can be simultaneously described. By a function of the mapping unit 120, for example, an operation map shown in FIG. 8 or 9 can be obtained.

The driving controlling unit 121 controls the direction of the optical axis of the surveying apparatus 100. In practice, it drives and controls horizontal rotation of the horizontal rotating unit 103 and vertical rotation of the vertical rotating unit 104. The data storing unit 122 stores data and an operation program required for operation of the surveying apparatus 100, surveying data, and data obtained as a result of kinds of processes.

The communicating device 123 communicates with an external device. The communication is performed by using wireless LAN or a communication line of a mobile telephone. Using the communicating device 123, data of the operation map exemplified in FIGS. 8 and 9 is transmitted to an external device.

Example of Process

Figure 4:
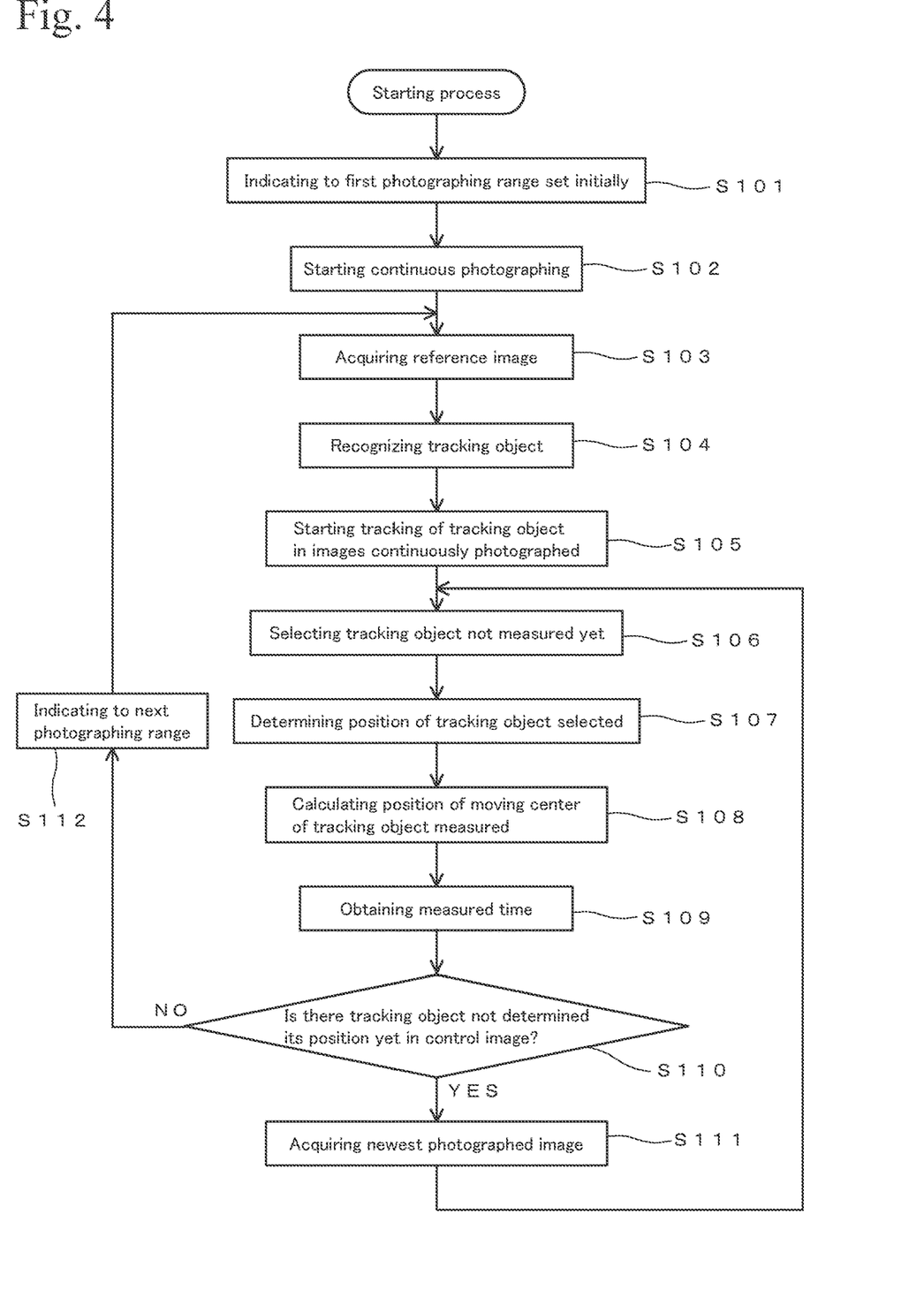
FIG. 4 is a flowchart diagram showing one example of steps of a process.

FIG. 4 shows one example of steps of operation performed in the surveying apparatus 100. A program to execute the flowchart shown in FIG. 4 is stored in an appropriate storage medium or storage region, and it is executed by a computer equipped in the surveying apparatus 100. An embodiment is also possible in which at least a part of the process shown in FIG. 4 is performed in an external controlling computer or processing server. It is also the same in a flowchart in FIG. 5 or 7.

First, before the processing, external orientation elements of the surveying apparatus 100 in a coordinate system used in a operation map are calculated. For example, external orientation elements of the surveying apparatus 100 in the absolute coordinate system are calculated. In addition, a range (measuring range) in which site resources are tracked and measured is preliminarily determined.

In addition, a photographing range with respect to the above measuring range is determined. For example, it is assumed that measuring is to be performed in a horizontal direction, an angle range of the measuring range is to be 90 degrees, photographing is to be performed by a wide angle camera 106, and photographing range of the wide angle camera 106 is to be 25 degrees. In this case, the range of 90 degrees is divided into four so as to set the photographing range. In this case, a first photographing range, a second photographing range, a third photographing range, and a fourth photographing range, each center direction shifting 90 degrees/4, are set. Of course, parts of photographing ranges can overlap. Furthermore, order of photographing the photographing ranges is determined. It should be noted that an embodiment is also possible in which a narrow angle camera 111 is used in photographing.

In the following process, it is assumed that site resources are construction machines 201 to 204 and workers (people) 301 to 304 shown in FIG. 1.

After starting the process, an optical axis of the surveying apparatus 100 is made indicating the first photographing range among the preliminarily set of photographing ranges mentioned above (step S101). Next, continuous photographing is started using a wide range camera 106 (step S102). This photographing is performed repeatedly at a specific interval. For example, photographing is performed at a 0.5 second interval or at a 1 second interval. An embodiment is also possible in which a moving image is recorded and frame images forming the moving image are used as the repeatedly photographed images.

After starting the continuous photographing, one image among them is acquired as a reference image (step S103). Next, image recognition of the site resource is performed on the reference image obtained in the step S103. For example, if the construction machine 201, and the workers 301, 302 and 303, of FIG. 1 are photographed in the reference image acquired in the step S103, in this case, images of the construction machine 201, and the workers 301, 302 and 303, are recognized by using an image analysis technique.

Figure 5:
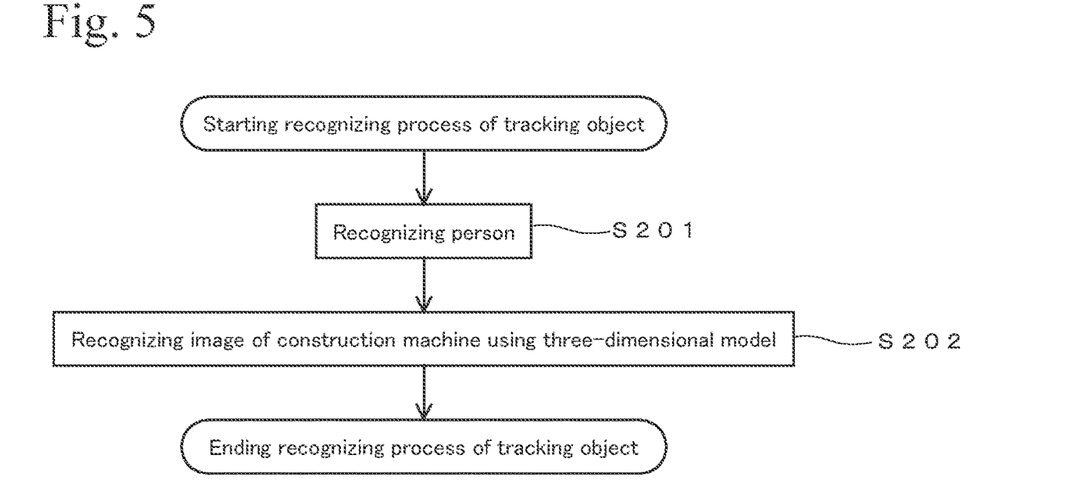
FIG. 5 is a flowchart diagram showing one example of steps of a process.

Hereinafter, details in the process of step S104 are explained. FIG. 5 is a flowchart showing details in the process in step S104. The process of FIG. 5 is performed with respect to the reference image acquired in the step S103.

First, using an image processing algorithm in which a person is recognized in a photographed image, a person is recognized in the objective image (step S201). As the image processing technique in which a person is recognized in a photographed image, techniques developed in the field of security or in the field of automatic vehicle driving technology is used.

Next, in the reference image acquired in the step S103, an image of a construction machine is recognized (step S202). Hereinafter recognition of the image of the construction machine is explained. Here, a method is explained in which an image of construction machine is recognized in a photographed image using a three-dimensional model. In this example, objective construction machines are listed preliminarily as candidates, and a three-dimensional model of each of the construction machines is obtained preliminarily. As a method to obtain the three-dimensional model of a construction machine, a method obtaining from design data, a method obtained from a three-dimensional photograph measurement, and a method obtaining by laser scanning may be mentioned.

The recognition of an image of a construction machine is performed step by step as follows. First, an element having characteristics of construction machine, that is, such as "having a caterpillar track", "having a wheel", "having an arm of crane", or "having an arm with a bucket", is recognized, and the image of a candidate construction machine is recognized as a first candidate group image. Next, the first candidate group image and the preliminarily prepared three-dimensional model are compared.

This comparison is performed as follows. First, (1) one of the three-dimensional models of construction machine preliminarily prepared is selected. Next, (2) an image in which the selected three-dimensional model is viewed from a specific viewpoint is obtained as a comparison image.

For example, the comparison image obtained from the three-dimensional model is a diagram in which the three-dimensional model if viewed from a specific viewpoint as shown in FIG. 6.

Next, (3) the comparison image obtained and the above first candidate group are compared. Here, with changing position of the viewpoint of (2), the process from (2) to (3) is repeated, and one which is the same as, or is similar to, the comparison image is searched for in the first candidate group. In addition, this searching is repeated with changing scale size.

In a case in which a comparison image the same as, or similar to, is found among the first candidate group as a result of performing process from (2) to (3) with respect to the three-dimensional model selected in (1), the construction machine of the three-dimensional model which is a basis for the comparison image is determined as a recognized object. On the other hand, in a case in which a comparison image that is the same as, or is similar to, is not found among the first candidate group, next, another three-dimensional model is selected so as to repeat a similar process.

In this way, an image corresponding to the preliminarily prepared three-dimensional model is searched for among the photographed images obtained in the step S103. Then, if an image corresponding to the preliminarily prepared three-dimensional model is found, it is recognized as an image of a construction machine. A process of FIG. 5 is performed in the step S104, and the images of workers and construction machine are recognized among the reference images acquired in the step S103.

Returning to FIG. 4, after the step S104, step S105 is executed. In the step S105, tracking of each (there is a case of only one, but a case of multiple items is assumed here) of the tracking objects (site resources) in which their images are recognized in the step S104 is started.

Hereinafter, the step S105 is explained in detail. First, among the reference images acquired in the step S103, a photographed image (next photographed image) which was photographed next to the above reference image (or photographed at a time as close as possible after that) is acquired, and the already recognized site resource is recognized in the image.

For example, it is assumed that the image of the construction machine in FIG. 6 is already recognized in the reference image. In this case, even if the construction machine is in operation, the external appearance of the construction machine on the display does not differ greatly in a photographed image next to the reference image. Therefore, in the next photographed image, an image of the construction machine in FIG. 6 can be specified easily.

Because the photographing is performed continuously, there may be cases in which position and external appearance of the construction machine vary gradually in a photographed display. However, in a case in which an nth photographed image and an n+1th photographed image are compared, it is easy for an image of the construction machine already recognized in the nth photographed image be recognized in the n+1th photographed image, for the reason mentioned above. By this principle, an image of the construction machine recognized in the step S104 is continuously recognized in images continuously photographed.

Furthermore, by a similar principle, tracking of the worker recognized in the reference image is performed. In this way, tracking of the tracking objects (construction machine and a worker in this case) in images continuously photographed is performed. That is, in multiple images which are separately distributed along a time axis and are obtained by continuous photographing, the same tracking object is sequentially recognized along the time axis.

Figure 10A:
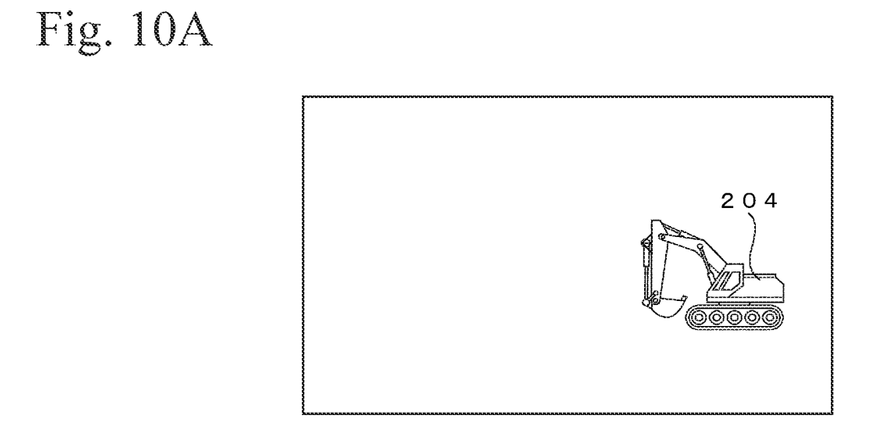
FIGS. 10A to 10C are diagrams showing photographed images in which the construction machine running is photographed.
Figure 10B:
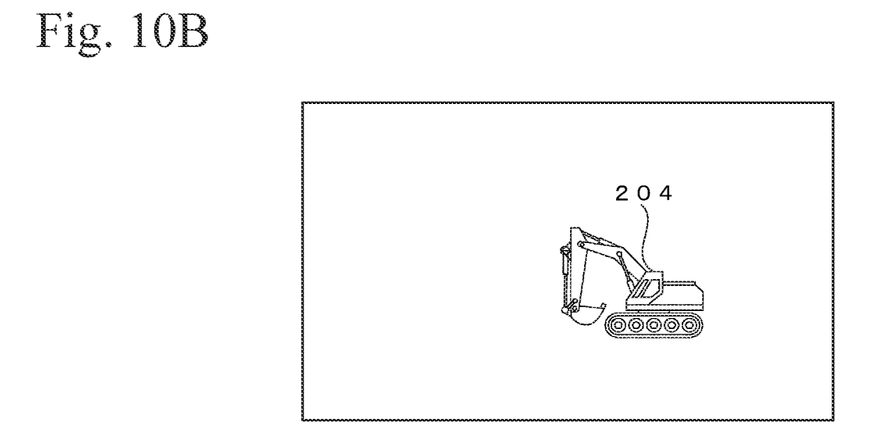
Figure 10C:
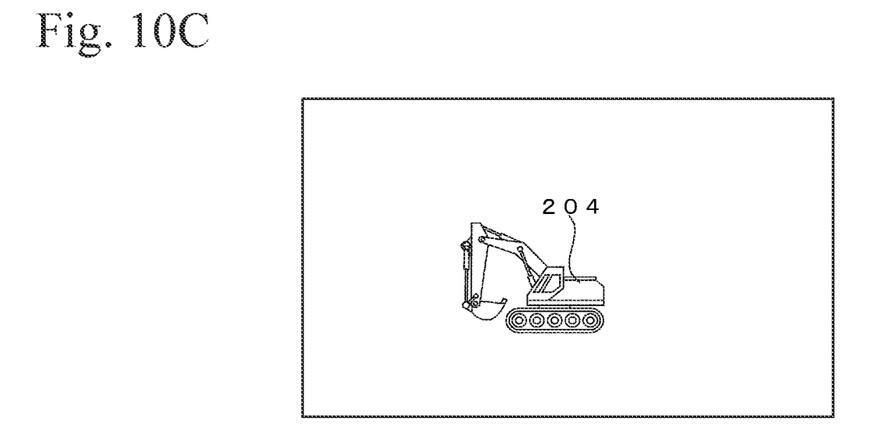

FIGS. 10A to 10C show an example of a model diagram of three photographed images which are continuously photographed in a condition in which an optical axis is fixed. Here, a case is shown in which (A) is photographed first, (B) is photographed next, and (C) is photographed later after that. That is, a case is shown in which photographing is performed in the order of (A), (B), and (C) along the time axis. Here, the construction machine 204 moves from right to left in the photographed display. Therefore, as passing (A), (B), and (C), the construction machine 204 gradually moves to the left.

Here, one which is image-recognized as the construction machine 204 in FIG. 10A is image-recognized as the same construction machine 204 at a display position slightly moved to the left in FIG. 10B, and furthermore, is image-recognized as the same construction machine 204 at a display position further slightly moved to the left in FIG. 10C. This is tracking of a tracking object in images continuously photographed as mentioned above.

In addition, in determining the position in step S107 explained below, an optical axis of the surveying apparatus 100 is made indicating each of the objects for which a position is to be determined. During this, direction of an optical axis of the wide angle camera 106 varies, and a position of a tracking object in a photographed display varies. However, as mentioned above, in a case in which an nth photographed image and an n+1th photographed image are compared, an image of a recognized object in the nth photographed image and an n+1th image of a recognized object in the photographed image of are similar.

Using this fact, a tracking object is tracked in varying directions of the optical axis of the wide angle camera 106. That is, in a situation in which direction of optical axis of the wide angle camera 106 varies, a corresponding relationship between a tracking object in the nth photographed image of a tracking object in the n+1th photographed image are specified, and thus, the tracking object which is focused on is tracked. The above process is started in the step S105.

The tracking with respect to a tracking object in continuous images mentioned above is applied to each of multiple site resources. In addition, during determining of the position mentioned below, collimation in which an optical axis of the surveying apparatus 100 is made indicating a measured point (action of targeting a point for determining position by the surveying apparatus 100) is performed. During this, tracking with respect to another tracking object, which is not an object for collimation, is continually performed. That is, while collimating and determining the position with respect to a tracking object in succession, tracking other multiple tracking objects which are recognized, is performed uninterrupted.

Next, a tracking object which is not yet measured at the time is selected (step S106). For example, in the reference image which is focused on at this time, it is assumed that the workers 301 to 303 and the construction machine 201 in FIG. 1 will be recognized as a tracking object and they will be tracked in the continuous photographing performed thereafter. In addition, it is assumed that the workers 301 and 302 will be measured.

In this case, the worker 303 and the construction machine 201 are an object not yet measured. Then, in this case, the worker 303 or the construction machine 201 is selected in the step S106.

Next, determining of position is performed with respect to the tracking object, which is selected in the step S106, and for which the position has not yet been determined (step S107).

Determining of position is performed using a function of laser measuring equipped in the surveying apparatus 100.

A measured point in a tracking object is determined as follows. In a case in which a tracking object is a person, a part around the waist is selected as a measured point. In a case in which a tracking object is a construction machine, a position of a center gravity of an image or a part of a main body part having the largest area is selected as a measured point.

Next, the position of a moving center of the tracking object measured at the step S107 is calculated (step S108). Determining the position of a tracking object is performed with respect to a part of its surface; however, it does not always reflect movement of the tracking object. Therefore, in order to understand moving (running) of the construction machine 600 on the ground, it is desirable to obtain a parameter in which movement of the construction machine 600 can be appropriately evaluated. As this parameter, a moving center is employed.

In a case in which a tracking object is a person, referring to a skeleton model which is preliminarily prepared, the moving center is calculated. For example, a position of a center gravity of the skeleton mode is calculated as the moving center. In a case in which a tracking object is a construction machine, the moving center is calculated by the following method.

Figure 7:
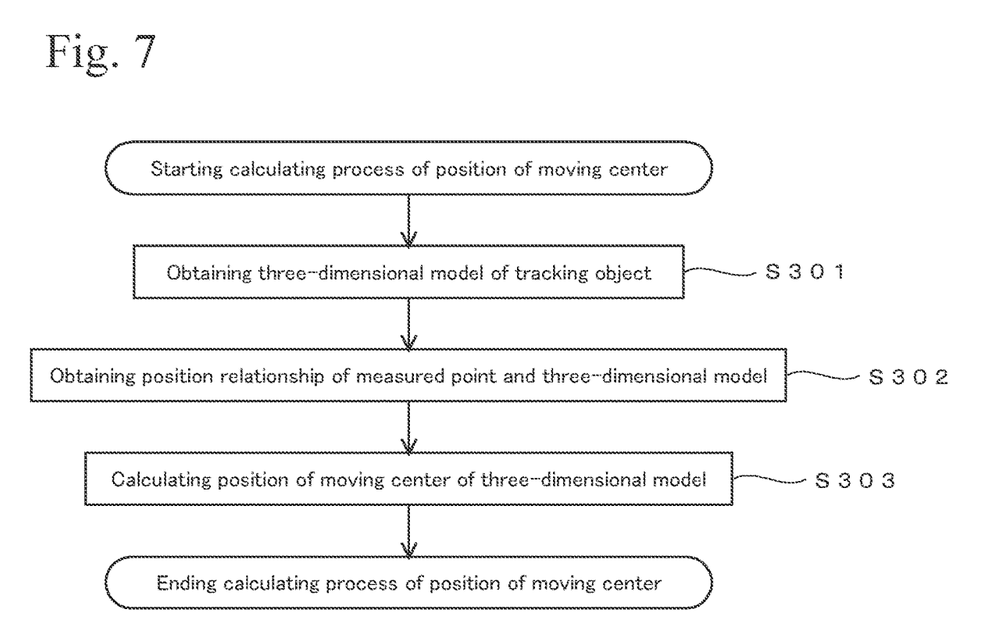
FIG. 7 is a flowchart diagram showing one example of steps of a process.

FIG. 7 is a flowchart diagram showing details of a process for calculating a moving center of a construction machine. In the process in FIG. 7, first, the three-dimensional model of the construction machine which is used in recognition of the tracking object and is tracked here is obtained (step S301). Next, position relationship between the position data obtained in the step S107 and the above three-dimensional model is obtained (step S302).

Here, during performing laser measuring in the step S107, photographing is performed by the narrow angle camera 111. Since an optical axis of the measuring unit 118 and an optical axis of the narrow angle camera exist on the same axis line, a center of a photographed image by the above narrow angle camera 111 is the measured point. Therefore, the position of a measured point on the tracking object is obvious.

Here, relationships of external orientation elements between the narrow angle camera 111 and the wide angle camera 106 are known. Therefore, a correspondence relationship between an image photographed by the narrow angle camera 111 and an image photographed by the wide angle camera 106 can be calculated. Furthermore, the relationship between the image of the tracking object photographed by the wide angle camera 106 and the three-dimensional model thereof is already obvious in the step S104. Therefore, a relationship between the point measured in the step S107 and the three-dimensional model can be obvious. That is, the point measured in the step S107 can be known as to what part of the three-dimensional model it corresponds. This position relationship between the measured point and the three-dimensional model is obtained in the step S302.

That is, the relationship between the external orientation elements of the narrow angle camera 111 and the wide angle camera 106 and external orientation elements of an optical system of the measuring unit 118 is known, and therefore, a position (element 2) of a reflection point of position-determining light in the image (element 1) of the construction machine photographed by the wide angle camera 106 can be calculated as a first relationship. On the other hand, from the relationship of the external orientation elements above, three-dimensional model (element 3) corresponding to the image (element 1) of the construction machine photographed by the wide angle camera 106 can be calculated as a second relationship.

That is, the relationship of the element 1 and the element 2 is obvious, and then, the relationship of the element 1 and the element 3 becomes obvious. In this way, a relationship of the element 2 and the element 3 becomes obvious. That is, the relationship between the position (element 2) of reflection point of position-determining light in the focused construction machine and the three-dimensional model (element 3) can be obtained. That is, the point (element 2) measured in the step S107 can be known as to what part of the three-dimensional model (element 3) it corresponds.

Next, based on the position relationship between the measured point obtained in the step S302 and the three-dimensional model, a position of a moving center of the three-dimensional model of the tracking object, which is focused on here, is calculated (step S303).

As is obvious from FIG. 6, in the three-dimensional model, a part corresponding to a moving base of the construction machine can be understood. In the case of FIG. 6, a part including a caterpillar track is a moving base 601. The moving center can be set wherever it is a point fixed to the moving base of a construction machine, for example, a position of a center of gravity of the moving base is calculated as the moving center.

According to the step S108, position information of a part of a base moving by the caterpillar track (for example, the moving base 601 of the construction machine 600) is obtained, and it is possible to evaluate information of moving (running) of the construction machine accurately. This position of the moving center is handled as the position data of the tracking object.

After calculating the position of the moving center of the tracking object, the time at which the position is calculated is obtained (step S109). Here, the time is obtained at which the determining of position process of the step S107 was performed.

Next, in the reference image acquired in the step S103, it is determined whether or not there is a tracking object for which the position has not yet been determined (step S110). In a case in which there is a tracking object for which the position has not yet been determined, the newest photographed image at that time is obtained (step S111), and the step S106 and the subsequent processes thereof are repeated.

In the step S110, in a case in which there is no tracking object for which the position has not yet been determined, the surveying apparatus 100 is indicated to a next photographing range, a reference image is acquired in the next photographing range (step S103), and the subsequent processes after the step S103 are repeated For example, it is assumed that a first photographing range, a second photographing range, and a third photographing range are set as photographing ranges. In this case, the processes of the step S103 and the subsequent steps in FIG. 4 is repeatedly performed in an order of the first photographing range, the second photographing range, the third photographing range, the first photographing range, the second photographing range, and the third photographing range.

As a result, with respect to each tracking object in the first to third photographing ranges, like a position of the moving center at the first time, a position of the moving center at the second time, a position of the moving center at the third time . . . , position information along the time axis can be obtained at discrete times.

Figure 8A:
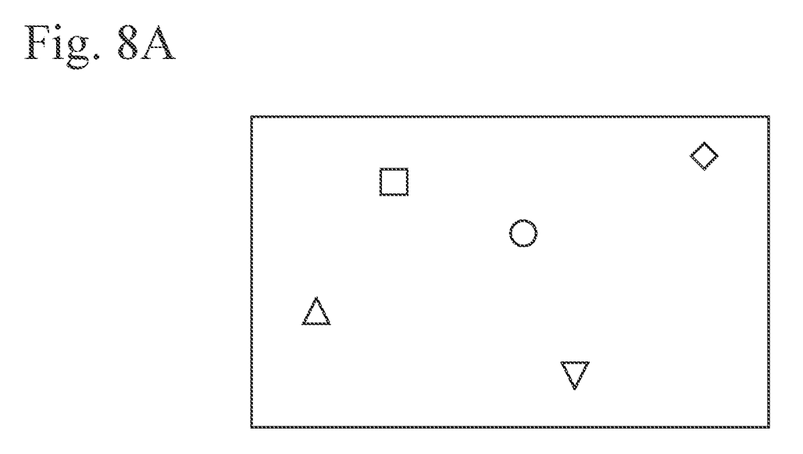
FIGS. 8A to 8C are diagrams in which positions of construction machines and workers are plotted
Figure 8B:
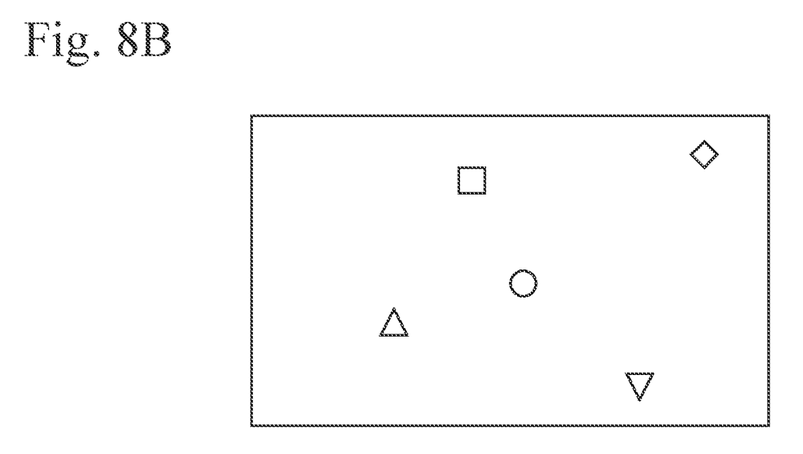
Figure 8C:
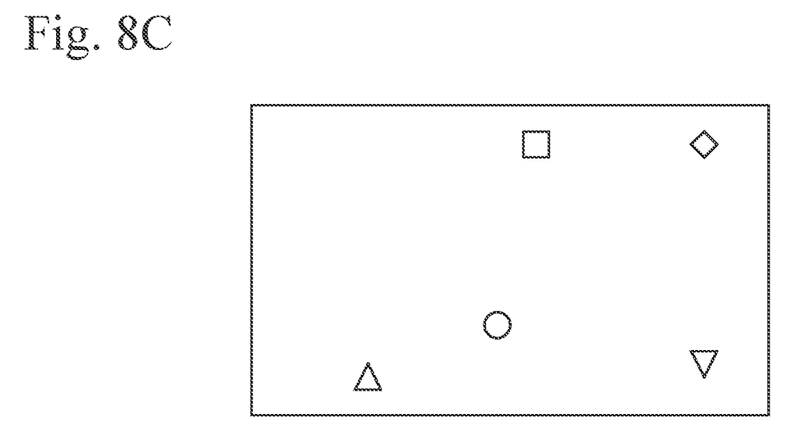
Figure 9:
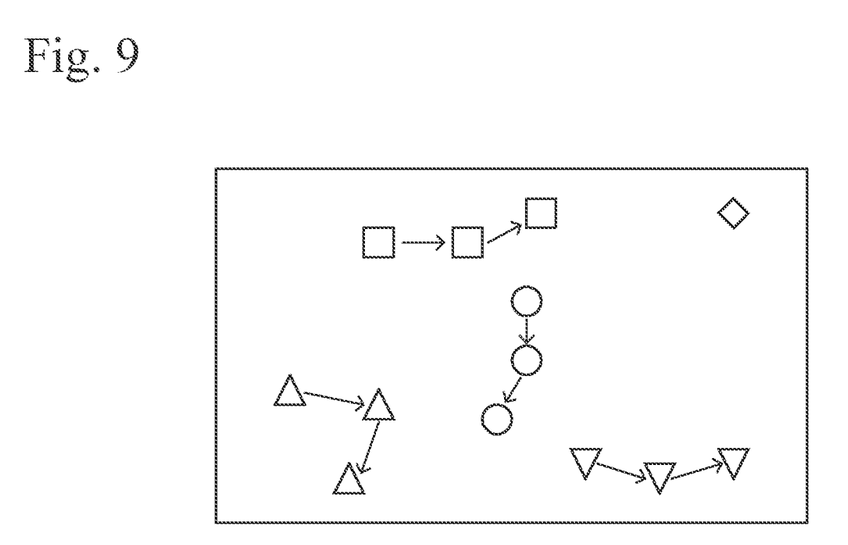
FIG. 9 is a diagram in which positions of the construction machines and workers are plotted.

FIG. 8A shows a diagram in which position of each of the tracking objects obtained by processes in a first lap (first round) is plotted on a map, FIG. 8B shows a diagram in which position of each of the tracking objects obtained by processes in a second lap is plotted on a map, and FIG. 8C shows a diagram in which position of each of the tracking objects obtained by processes in a third lap is plotted on a map.

In FIGS. 8A to 8C, positions of a construction machine (square), a construction machine (triangle), a construction machine (circle), a construction machine (opposite triangle), and a construction machine (rhomboid) are plotted on the map. A shift that occurred on the plotted point in FIGS. 8A to 8C indicates that the construction machine moved.

In FIG. 8A, a time obtaining position of the construction machine (square) and a time obtaining position of the construction machine (triangle) are different. This is because determining of position is performed and the moving center is calculated in a sequential manner with respect to the tracking objects. This is also similar in a relationship between one construction machine and another construction machine.

FIG. 9 is made overlapping FIGS. 8A to 8C. In the map of FIG. 9, arrows clearly indicate movements of each of the construction machines in time series. From FIG. 9, movement of each of the construction machines can be known. That is, moving transition of each of the tracking objects, that is, the operation situation, is shown in FIG. 9.

2. Second Embodiment

Identification of the site resources can be performed by using a code display. For example, the workers operate while wearing helmets and reflective vests (vests on which reflective material is attached) in order to maintain safety. An identification display is attached to a helmet or reflective vest so as to image-recognize and identify the worker. As the identification display, a character, barcode, diagram, and color can be mentioned.

In a case of a construction machine, the identification display is displayed on a part of the construction machine which can be easily viewed. Embodiment of the identification display is the same as in the case of a reflective vest. An embodiment is possible in which a pole or the like having the identification display is arranged on an upper part of the construction machine so as to enable identification from any direction.

3. Third Embodiment

In measuring in a second round and a subsequent round, the tracking object can be identified by using the image obtained in the first round.

4. Other Matters

A site of civil engineering work is shown in FIG. 1 as an example of a construction site; however, the present invention can be applied to monitor the operation situations of site resources at a construction site such as a building, factory or any other kind of establishment.

EXPLANATION OF REFERENCE NUMERALS

100: Surveying apparatus, 101: tripod, 102: base unit, 103: horizontal rotating unit, 104: vertical rotating unit, 105: telescope, 106: wide angle camera, 107: eyepiece unit, 108: touch panel display.

What is claimed is:
1. A measuring system comprising:
a camera for continuously photographing construction machines which include a base unit for running and a movable unit moving on the base unit and perform operations at a construction site,
a recognizing means for recognizing the construction machines in photographed images obtained by the photographing,
a tracking means for tracking the image of the construction machines recognized in the multiple photographed images obtained by the continuous photographing,
a position-determining means for collimating to the construction machines which are objects to be tracked, and determining the positions of the construction machines by laser light; and a moving center calculating means for calculating a point fixed on the base unit, not a measured point, as a moving center based on a result of the determining the positions, wherein the determining the positions is performed multiple times at intervals.

2. The measuring system according to claim 1, wherein the system further comprises a map-preparing means for a map displaying movement transitions of the construction machines.

3. The measuring system according to claim 1, wherein recognition of the construction machines is performed by comparison between an image photographed by the camera, and an image in which a preliminarily prepared three-dimensional model of the construction machines which is an object to be recognized is viewed from multiple different viewpoints.

4. The measuring system according to claim 1, wherein a relationship between external orientation elements of the camera and external orientation elements of the position-determining means is known, based on the relationship, a position of a reflection point of the laser light in the image of the construction machine photographed by the camera is calculated as a first relationship, by the comparison, a three-dimensional model corresponding to the image of the construction machine photographed by the camera is calculated as a second relationship, based on the first relationship and the second relationship, position of reflection point of the laser light in the three-dimensional model of the construction machine is calculated, and based on a position of a reflection point of the laser light in the three-dimensional model of the construction machine, the moving center is calculated.

5. The measuring system according to claim 1, wherein the construction machines are multiple, the tracking is performed with respect to each of the multiple construction machines, the continuous photographing is continued during the collimating, and the tracking is performed with respect to the construction machines which are not objects of the collimating during the collimating.

6. A measuring method comprising:

a step of continuously photographing construction machines which include a base unit for running and a movable unit moving on the base unit and perform operations at a construction site by a camera, a step of recognizing the construction machines in photographed image obtained by the photographing, a step of tracking the image of the construction machines recognized in the multiple photographed images obtained by the continuous photographing, a step of determining position collimating to the construction machines which are objects to be tracked, and determining the position of construction machines by laser light; and a step of calculating moving center calculating a point fixed on the base unit, not a measured point, as a moving center based on a result of the determining the position, wherein the determining of the position is performed multiple times at intervals.

7. A non-transitory computer recording medium storing computer executable instructions for a measuring program that, when executed by a computer processor, cause the computer processor to execute the following steps, comprising:

a step of continuously photographing construction machines which include a base unit for running and a movable unit moving on the base unit and perform operations at a construction site by a camera, a step of recognizing the construction machines in photographed image obtained by the photographing, a step of tracking the image of the construction machines recognized in the multiple photographed images obtained by the continuous photographing, a step of determining position collimating to the construction machines which are objects to be tracked, and determining the position of construction machines by laser light; and a step of calculating moving center calculating a point fixed on the base unit, not a measured point, as a moving center based on a result of the determining the position, wherein the determining of the position is performed multiple times at intervals.

* * * * *